US012515364B2

(12) United States Patent
Duan et al.

(10) Patent No.: US 12,515,364 B2
(45) Date of Patent: Jan. 6, 2026

(54) METHOD FOR STRIPPING ENCAPSULATION LAYER OF CABLE

(71) Applicant: SHINDA (TANGSHAN) CREATIVE OIL & GAS EQUIPMENT CO. LTD., Hebei (CN)

(72) Inventors: Jianliang Duan, Hebei (CN); Jian Dong, Hebei (CN); Qifa Sun, Hebei (CN)

(73) Assignee: SHINDA (TANGSHAN) CREATIVE OIL & GAS EQUIPMENT CO. LTD., Hebei (CN)

( * ) Notice: Subject to any disclaimer, the term of this patent is extended or adjusted under 35 U.S.C. 154(b) by 408 days.

(21) Appl. No.: 18/029,039

(22) PCT Filed: Sep. 1, 2022

(86) PCT No.: PCT/CN2022/116495
§ 371 (c)(1),
(2) Date: Mar. 28, 2023

(87) PCT Pub. No.: WO2024/045131
PCT Pub. Date: Mar. 7, 2024

(65) Prior Publication Data
US 2024/0359352 A1     Oct. 31, 2024

(30) Foreign Application Priority Data
Aug. 29, 2022 (CN) .......................... 202211042029.7

(51) Int. Cl.
*B26D 3/28*     (2006.01)
(52) U.S. Cl.
CPC ..................................... *B26D 3/28* (2013.01)

(58) Field of Classification Search
CPC .......... B23D 3/28; B26D 3/28; H02G 1/1204; H02G 1/1209; H02G 1/1212;
(Continued)

(56) References Cited

U.S. PATENT DOCUMENTS

| 3,239,916 A | * | 3/1966 | Lee | ........................... | H01B 7/38 |
| | | | | | 439/492 |
| 3,871,078 A | * | 3/1975 | Ogle | ........................ | B25B 7/22 |
| | | | | | 30/90.1 |

(Continued)

FOREIGN PATENT DOCUMENTS

| CN | 2664844 Y | 12/2004 |
| CN | 203312719 U | 11/2013 |

(Continued)

OTHER PUBLICATIONS

International Search Report of the ISA issued in PCT/CN2022/116495, mailed Dec. 21, 2022; ISA/CN.

*Primary Examiner* — Adam J Eiseman
*Assistant Examiner* — Fernando A Ayala
(74) *Attorney, Agent, or Firm* — Harness, Dickey & Pierce, P.L.C.

(57) ABSTRACT

A method for stripping an encapsulation layer of a cable is provided, which relates to the encapsulating a layer stripping. The method mainly includes pre-stripping a left part of the encapsulation layer, pre-stripping a right part of the encapsulation layer, pre-stripping an upper part of the encapsulation layer, secondarily stripping the upper part of the encapsulation layer stripping the lower part of the encapsulation layer, and stripping the right and left parts of the encapsulation layer. The encapsulation layer is completely stripped and the central pipe body of the cable is completely exposed.

7 Claims, 6 Drawing Sheets

(58) Field of Classification Search
CPC .. H02G 1/1217; H02G 1/1219; H02G 1/1229; H02G 1/1236; H02G 1/1273; H02G 1/1297
USPC .......................................................... 83/870
See application file for complete search history.

(56) References Cited

U.S. PATENT DOCUMENTS

| | | | | |
|---|---|---|---|---|
| 4,628,599 | A * | 12/1986 | Bermier, Jr. | H01B 7/0823 83/947 |
| 4,719,697 | A * | 1/1988 | Schwartzman | H01R 43/05 81/9.51 |
| 4,766,669 | A | 8/1988 | Schwartzman | |
| 4,779,328 | A * | 10/1988 | Hasegawa | H01R 43/05 29/762 |
| 5,377,410 | A * | 1/1995 | Welch | H02G 1/1224 30/90.1 |
| 6,195,897 | B1 * | 3/2001 | Eslambolchi | G02B 6/566 30/90.1 |
| 6,494,118 | B2 * | 12/2002 | Meisser | H02G 1/1285 81/9.51 |
| 11,710,585 | B2 * | 7/2023 | Houser | H02G 1/1275 29/825 |
| 2003/0196520 | A1 * | 10/2003 | Locher | H02G 1/1256 81/9.51 |

FOREIGN PATENT DOCUMENTS

| | | |
|---|---|---|
| CN | 204027984 U | 12/2014 |
| CN | 204263684 U | 4/2015 |
| CN | 207077340 U | 3/2018 |
| CN | 113189725 A | 7/2021 |
| CN | 215221599 U | 12/2021 |
| JP | 2002086565 A | 3/2002 |

* cited by examiner

METHOD FOR STRIPPING ENCAPSULATION LAYER OF CABLE

CROSS REFERENCE TO RELATED APPLICATION

This patent application is a national stage application of International patent application No. 202211042029.7 filed on Aug. 29, 2022, the disclosure of which is incorporated by reference herein in its entirety as part of the present application.

TECHNICAL FIELD

The present disclosure relates to the technical field of encapsulation layer stripping, and in particular, to a method for stripping an encapsulation layer of a cable.

BACKGROUND ART

Due to the influence of the hardness and density of an encapsulation material of a commercially available encapsulated cable, an encapsulation layer of the encapsulated cable is difficult to strip, and an outer encapsulation can only be stripped by means of blade cutting or adding a tearing rope inside the encapsulation layer. The method of adding a tearing rope inside the encapsulation has the disadvantages that the rope is easy to break, and the operation of individually stripping the rope is heavy and complicated. Further, the method of blade cutting may cause damage to the central pipe body and has a potential safety hazards. In addition, in order to realize fast stripping, the existing encapsulated cable satisfies the purpose of encapsulation stripping by changing the appearance of the encapsulation. The method of changing the appearance of the encapsulation is to add a plurality of grooves at portions that require the stripping treatment, which results in thinner encapsulations at the grooves and reduces the corrosion resistance of the encapsulated cable.

Therefore, with regard to the encapsulated cable with a complete structure, there is a technical problem to be solved urgently by a person skilled in the art of how to develop a safe and convenient manual stripping method to facilitate a quick stripping operation on an end portion of the encapsulated cable during connecting the encapsulated cable.

SUMMARY

An objective of the embodiments is to provide a method for stripping an encapsulation layer of a cable (i.e. the encapsulated cable), so as to solve the problem in the prior art that a central pipe body is damaged or the operation of stripping the tearing rope is heavy and complicated when stripping is performed by using a blade or a tearing rope.

In order to solve the described technical problem, the embodiments adopt the following technical solutions.

The present disclosure provides a method for stripping an encapsulation layer of a cable, which specifically includes the following steps:

step 1, pre-stripping a left part of the encapsulation layer: by a stripping clamp, clamping the left part and splitting the left part from the encapsulation layer at a first separating line which is corresponding to a first left color-recognition strap of the cable, and tearing away the left part for a first length from the encapsulation layer;

step 2, pre-stripping a right part of the encapsulation layer: by the stripping clamp, clamping the right part and splitting the right part from the encapsulation layer at a second separating line which is corresponding to a first right side color-recognition strap of the cable, and tearing away the right part for the first length from the encapsulation layer;

step 3, pre-stripping an upper part of the encapsulation layer: by the stripping clamp, clamping the upper part and splitting the upper part from the encapsulation layer at a central third separating line, and tearing away the upper part for the first length from the encapsulation layer to obtain a pre-stripped upper encapsulation layer;

step 4, stripping the upper part secondarily: clamping and pulling backwards the pre-stripped upper part of the encapsulation layer in the step 3 by a clamping tool for a second length;

step 5, stripping a lower part of the encapsulation layer, and stripping the right part and the left part secondarily: enabling a top of each of the left part and the right part to be exposed, after the upper part is secondarily stripped; and clamping and pulling backwards the lower part by the stripping clamp for the second length, where, the left part and the right part are separating apart by pulling backwards the lower part; and step 6, stripping the encapsulation layer completely and exposing a central pipe body of the cable which is inside the encapsulation layer, cutting the encapsulation layer which is stripped, and exposing the central pipe body completely.

Further, the first length in the step 1 to the step 3 is 5 cm to 10 cm, the second length in the step 4 to the step 5 is greater than the first length in the step 1 to the step 3.

Further, the clamping tool in the step 4 is the stripping clamp or a rotating stripper.

Further, the stripping clamp includes two clamp mouths and two opening and closing handles, each of the clamp mouths and a corresponding one of the opening and closing handles are integrally formed as an integral portion, the integral portion is placed across and connected with another integral portion by a hinge shaft.

Further, each of the two clamp mouths is designed to be in an L-shaped beak shape, and a working end of each of the two clamp mouths is configured to be a sharp head.

Further, the rotating stripper includes a rotating head and a rotating handle, and the rotating head is perpendicularly connected to the rotating handle at a middle position of the rotating handle via a connecting member.

Further, the rotating head is provided with a clamping opening, and the clamping opening matches a specification of the upper part of the encapsulation layer.

Compared with the prior art, the embodiments have the following beneficial technical effects.

The present disclosure provides a method for stripping an encapsulation layer of a cable. According to the order of first pre-stripping two side parts of the encapsulation layer and then the middle parts of the encapsulation layer, a stripping clamp with a sharp head is mainly used for clamping and tearing away part(s) of the encapsulation layer from the encapsulation layer, so as to achieve pre-stripping operation. After the pre-stripping operation is finished, a stripping clamp or a rotating stripper is used for a secondary stripping operation. The encapsulation layer is finally dragged or rotationally stripped along a central pipe body to a required position. After cutting the encapsulation layer, the central pipe body of the cable is completely exposed. The arrangement of the steps of the present disclosure is reasonable, and the operation is convenient and fast. So, it is easy to be mastered by a skilled in the art. The stripping clamp is used to strip to expose the inner central pipe body, so that whole stripping of a long encapsulation layer can be completed without changing the appearance of the encapsulation layer, and the performance of the encapsulated cable is effectively ensured. The method is suitable for a stripping operation of a whole flat encapsulated cable, or a stripping operation of a tubular product having a similar structure, i.e. a tubular product including an encapsulation layer.

BRIEF DESCRIPTION OF THE DRAWINGS

The present disclosure is further described below with reference to the accompanying drawings.

Figure 1:
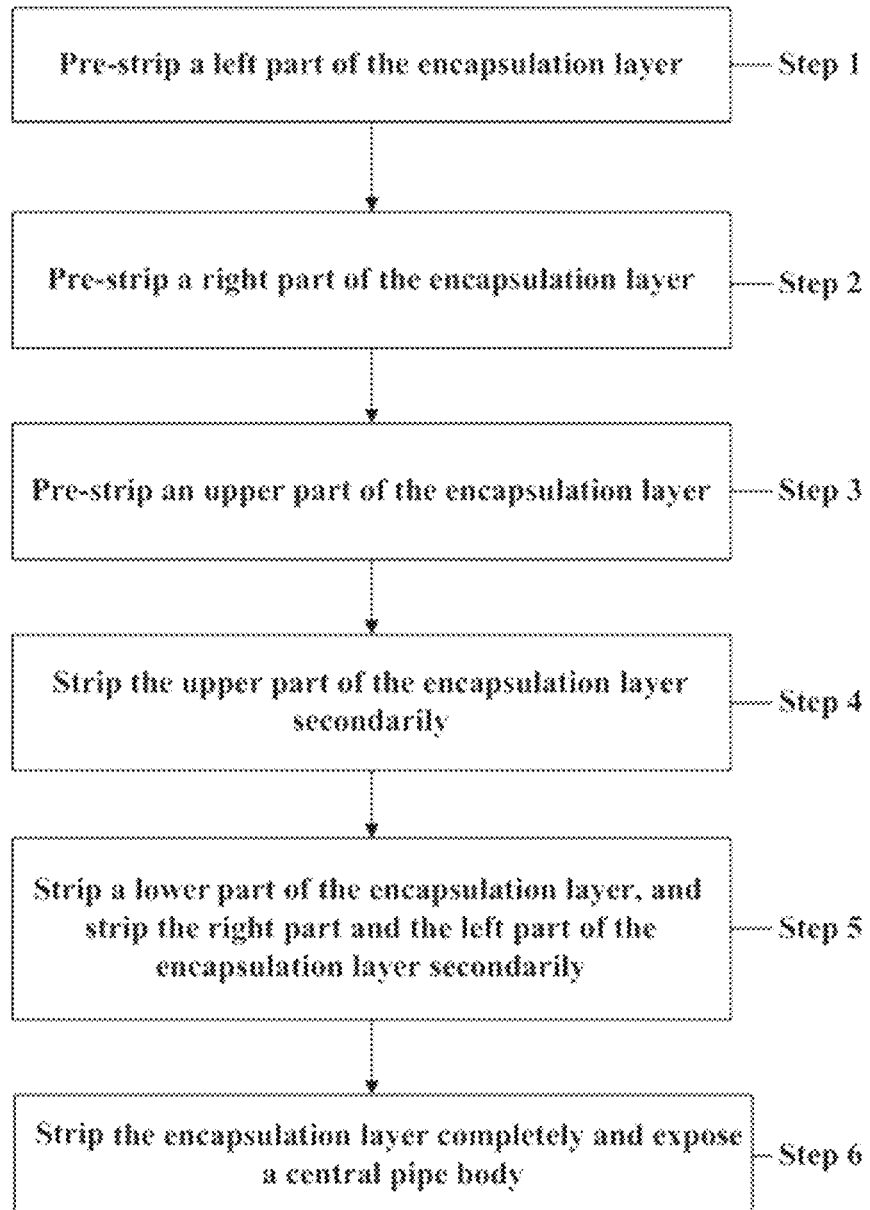
FIG. 1 is a flowchart of a method for stripping an encapsulation layer of a cable according to an embodiment of the present disclosure.

List of reference numerals: 1 encapsulation layer; 2 central pipe body; 3 color-recognition strap; 4 first separating line; 5 second separating line; 6 third separating line; 7 stripping clamp; 701 clamp mouth; 702 hinge shaft; 703 opening and closing handle; 8 rotating stripper; 801 rotating head; 8011 clamping opening; 802 connecting member; 803 rotating handle.

DETAILED DESCRIPTION OF THE EMBODIMENTS

In order to make the technical problem to be solved, the technical solutions and beneficial effects of the present disclosure clearer and more comprehensible, the present disclosure is further described below in detail with reference to the accompanying drawings and embodiments. It should be understood that the specific embodiments described herein are only intended to explain the present disclosure, but not to limit the present disclosure.

It should be noted that the terms "first" and "second" are only used for descriptive purposes, rather than being understood as indicating or implying relative importance or implicitly indicating the number of indicated technical features. Thus, the features defined by "first" and "second" may explicitly or implicitly include one or more of the technical features. In the description of the present disclosure, "a plurality of" means two or more than two, unless specifically defined otherwise. The meaning of "several" is one or more unless otherwise expressly and specifically defined.

In the description of the present disclosure, it should be understood that, orientation or position relationships indicated by terms such as "upper", "lower", "front", "rear", "left", and "right" are orientation or position relationships based on the accompanying drawings, which are only used to facilitate the description of the present disclosure and simplify the description, rather than indicating or implying that the device or element referred to must have a specific orientation, and be constructed and operated in a specific orientation, and therefore the above described terms cannot be construed as a limitation to the present disclosure.

Figure 2:
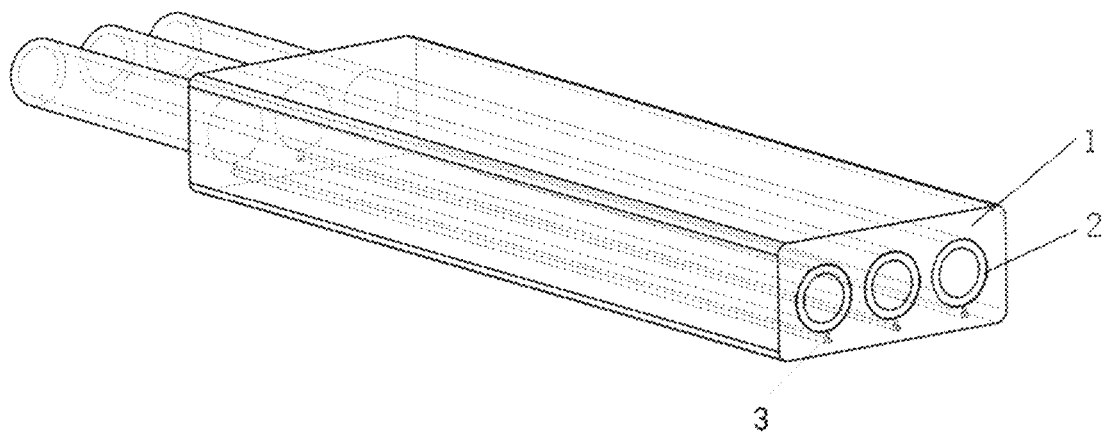
FIG. 2 is a schematic structural (perspective) diagram of a cable according to an embodiment of the present disclosure.
Figure 3:
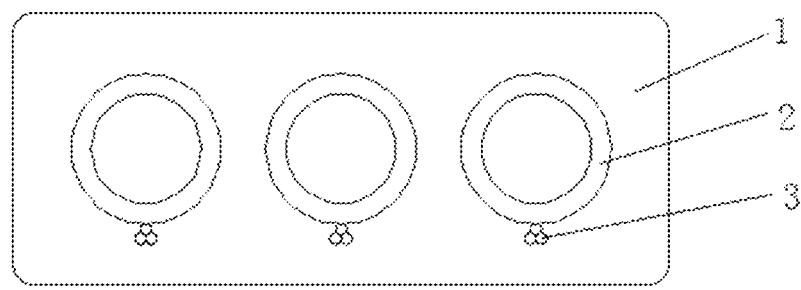
FIG. 3 is a side view of the cable according to an embodiment of the present disclosure.
Figure 4:
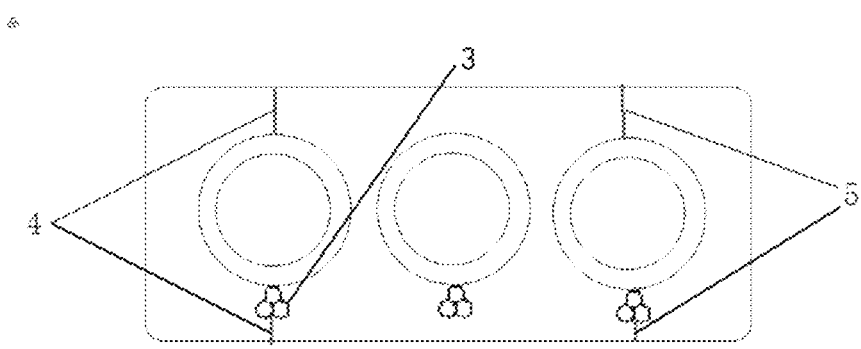
FIG. 4 is a diagram of a position of separating lines when a left part and a right part of an encapsulation layer of the cable are stripped according to an embodiment of the present disclosure.
Figure 5:
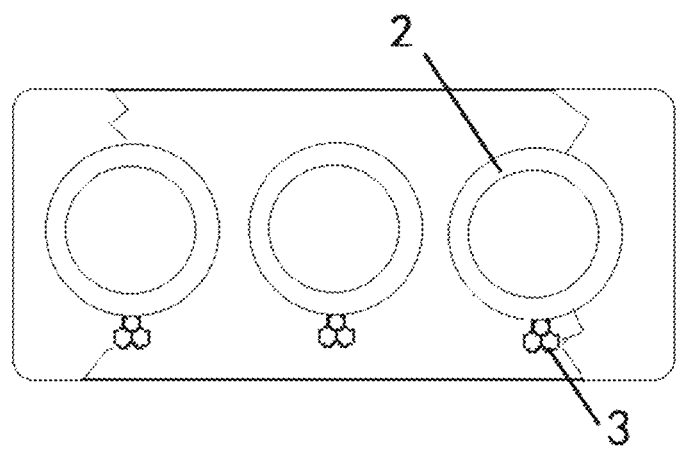
FIG. 5 is a sectional schematic view showing the left part and the right part of the encapsulation layer have been stripped according to an embodiment of the present disclosure.
Figure 6:
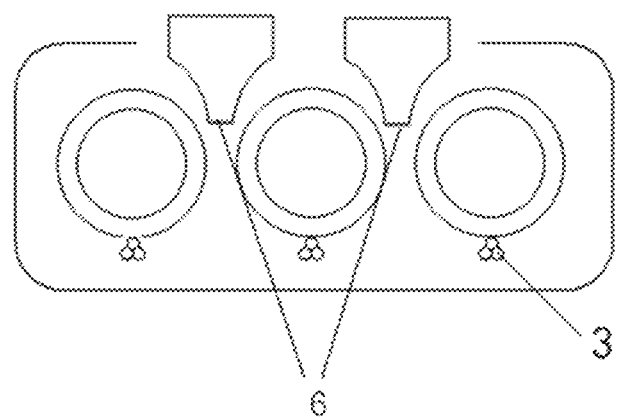
FIG. 6 is a diagram of a position of separating lines when an upper part of the encapsulation layer is stripped according to an embodiment of the present disclosure.
Figure 7:
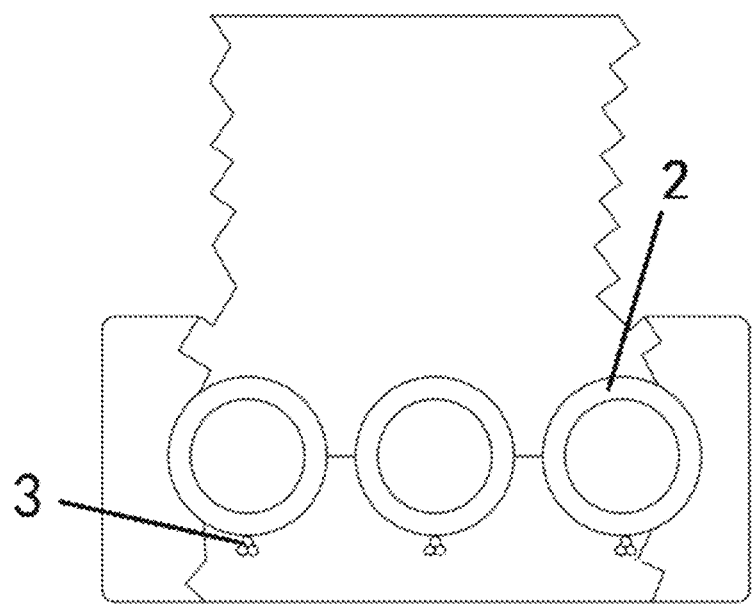
FIG. 7 is a schematic sectional view showing the upper part of the encapsulation layer has been stripped according to an embodiment of the present disclosure.
Figure 8:
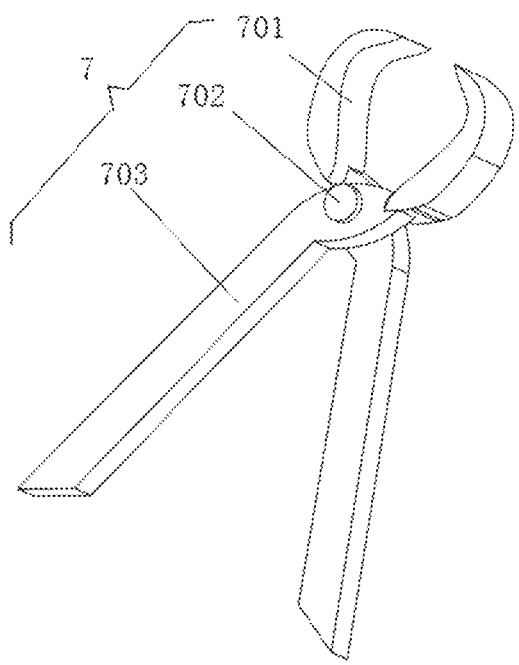
FIG. 8 is a schematic structural diagram of a stripping clamp according to an embodiment of the present disclosure.
Figure 9:
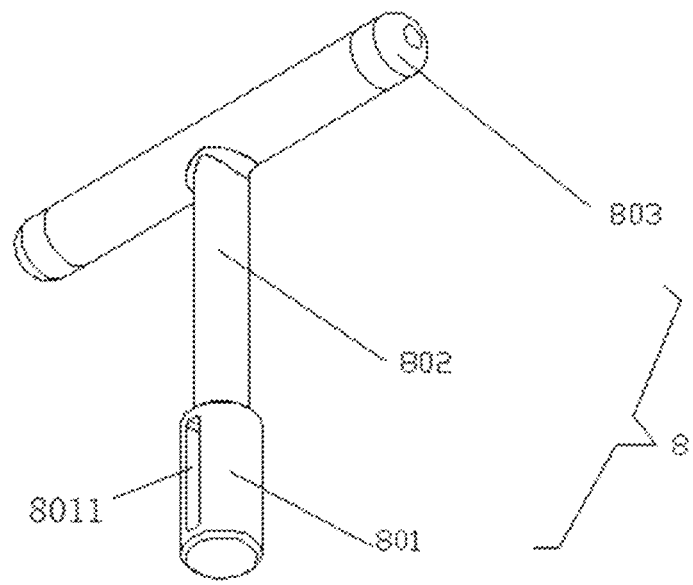
FIG. 9 is a schematic structural view of a rotating stripper according to an embodiment of the present disclosure.
Figure 10:
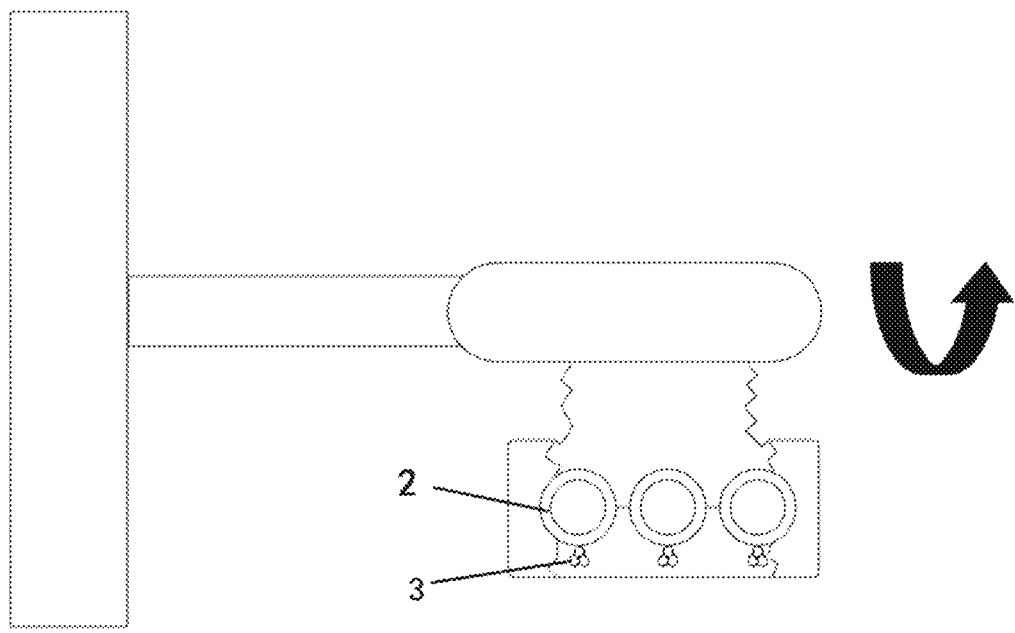
FIG. 10 is a schematic diagram showing a state of using the rotating stripper according to an embodiment of the present disclosure.
Figure 11:
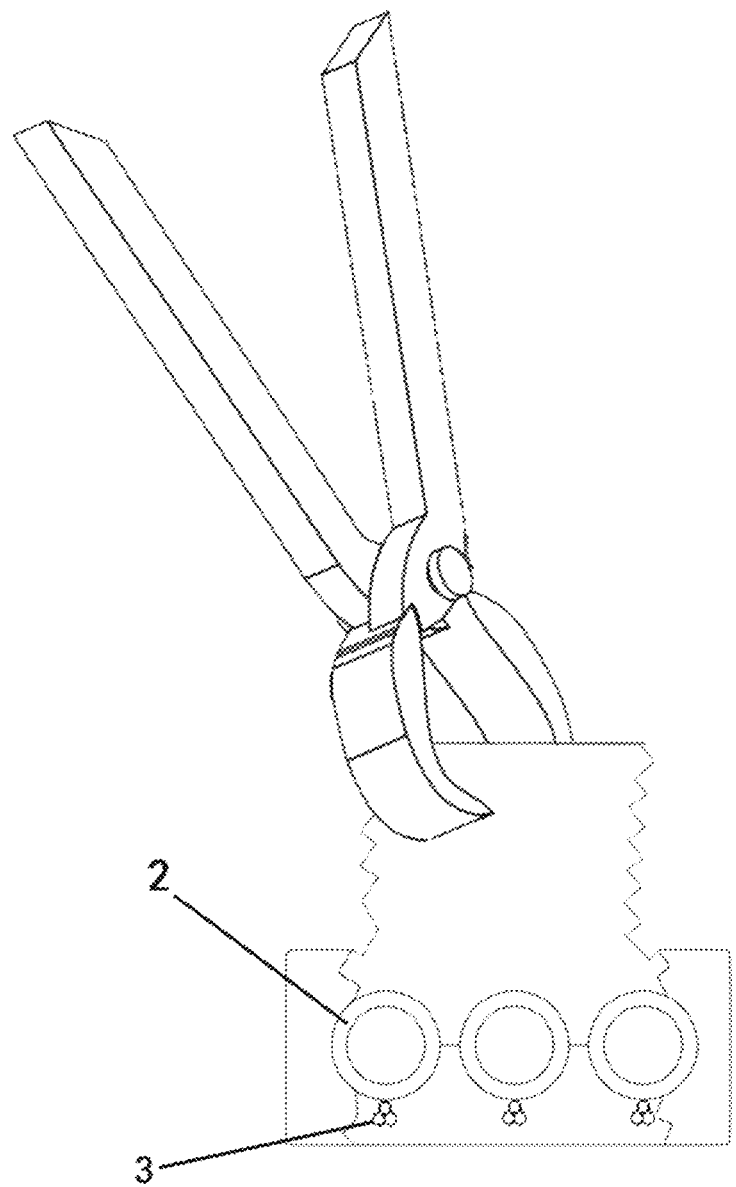
FIG. 11 is a schematic diagram showing a state of secondarily stripping the upper part of an encapsulation layer by the rotating stripper according to an embodiment of the present disclosure.

As shown in FIGS. 1-11, a method for stripping an encapsulation layer of a cable specifically includes the following steps 1 to 6.

In step 1, a left part of the encapsulation layer is pre-stripped. Specifically, the the left part is clamped and splitted by a stripping clamp 7 at a first separating line 4 which is corresponding to a first left color-recognition strap 3, and the left part of the encapsulation layer is torn away for a first length.

In step 2, a right part of the encapsulation layer is pre-stripped. Specifically, the right part is clamped and splitted by a stripping clamp 7 at a second separating line 5 which is corresponding to a first right color-recognition strap 3, and the right part of the encapsulation layer is torn away for the first length.

In step 3, an upper part of the encapsulation layer is pre-stripped. Specifically, the upper part is clamped and splitted by the stripping clamp 7 at a central third separating line 6, and the separated upper part of the encapsulation layer is torn away for the first length.

In step 4, the upper part of the encapsulation layer is secondarily stripped. Specifically, the pre-stripped upper part of the encapsulation layer is clamped and pulled backwards by a clamping tool for a second length. When the stripping operation for the encapsulation layer ends, the upper part of the central pipe body 2 is exposed.

In step 5, the lower part of the encapsulation layer is stripped, and the right and left parts of the encapsulation layer are secondarily stripped. The top of each of the right and left parts of the encapsulation layer is exposed, after the upper part of the encapsulation layer is secondarily stripped. The lower part of the encapsulation layer is clamped and pulled backwards by the stripping clamp for the second length, where the left part and the right part are separating apart by pulling backwards the lower part.

In step 6, the encapsulation layer is completely stripped and the central pipe body of the cable is exposed, the stripped encapsulation layer 1 is cut, and the inner central pipe body 2 is completely exposed.

In the method for stripping, according to the order of first pre-stripping two side parts of the encapsulation layer and then the middle parts of the encapsulation layer, a stripping clamp with a sharp head is mainly used for clamping and tearing away part(s) of the encapsulation layer from the encapsulation layer, so as to achieve pre-stripping operation. The color-recognition strap 3 is an elongated strip with any color penetrating the encapsulation layer to indicate the position for pre-stripping the side part of the encapsulation layer. After the pre-stripping operation is finished, a stripping clamp or a rotating stripper is used for a tearing and stripping operation. The encapsulation layer is finally dragged along a central pipe body to a required position. And after cutting the encapsulation layer, the central pipe body is completely exposed. The arrangement of the steps of the present disclosure is reasonable, and the operation is convenient and fast. So it is easy to be mastered by a skilled in the art. The stripping clamp is used to strip to expose the inner central pipe body, so that whole stripping of a long encapsulation layer can be completed without changing the appearance of the encapsulation layer, and the performance of the encapsulated cable is effectively ensured. The method is suitable for a stripping operation of a whole flat encapsulated cable which includes or does not include the color-recognition straps.

Specifically, the pre-stripping operations in the steps 1 to 3 refers to operations of tearing and separating for the first length which is 5 cm to 10 cm, so it ensures that positioning operations for clamping or crimping respectively by the stripping clamp or the rotating stripper are smoothly performed during the secondary stripping operation. The second length in the step 4 to the step 5 is far greater than the first length in the steps 1 to 3, and the second length is a predetermined and required length, i.e., the encapsulation layer is stripped according to the length required by a user.

As shown in FIGS. 8-11, the clamping tool in the step 4 is the stripping clamp 7 or the rotating stripper 8. The stripping clamp 7 or the rotating stripper 8 is made of a metal material, and is simple in structure, easy to be handled, as well as convenient and fast to be operated.

Specifically, the stripping clamp 7 includes two clamp mouths 701 and two opening and closing handles 703. Each of the clamp mouths 701 and a corresponding one of the opening and closing handles 703 are integrally formed as an integral portion, which is placed across and connected with another integral portion by a hinge shaft 702. The above another integral portion is formed by another clamp mouth 701 and another opening and closing handle 703. The clamp mouth 701 is designed to be in an L-shaped beak shape, and a working end of the clamp mouth 701 is provided with a sharp head. The sharp head is designed to facilitate a clamping and tearing operation during pre-stripping the encapsulation layer. Specifically, a standard nutcracker may be used as the stripping clamp, and the existing nutcracker may also be customized and reworked, for example, the sharpness of the clamp mouth 701 is improved, so as to better implement the clamping and tearing operation.

Specifically, the rotating stripper 8 includes a rotating head 801 and a rotating handle 803. The rotating head 801 is perpendicularly arranged and connected to the rotating handle 803 at a middle position of the rotating handle 803 via the connecting member 802 by welding. The rotating head 801 is provided with a clamping opening 8011, which is an elongated hole. The clamping opening 8011 matches a specification of the upper part of the encapsulation layer, such that the encapsulation layer can be inserted into the clamping opening 8011. When the rotating handle 803 is rotated, the upper part of the encapsulation layer is pressed by the outer layer of the upper part of the encapsulation layer which has rolled around the rotating head, and the rotating handle 803 can continues to be rotated. A force is convenient to be applied on the rotating handle 803, and the upper part of the encapsulation layer can be torn and stripped more easily.

The embodiments described above are only preferred embodiments of the present disclosure, and are not intended to limit the scope of the present disclosure. Without departing from the design spirit of the present disclosure, those skilled in the art can make various modifications and improvements to the technical solutions of the present disclosure, which shall fall in the scope of protection defined by the claims of the present disclosure.

What is claimed is:

1. A method for stripping an encapsulation layer of a cable, the method comprising following steps:
   step 1, pre-stripping a left part of the encapsulation layer: by a stripping clamp, clamping the left part and splitting the left part from the encapsulation layer at a first separating line which is corresponding to a first left color-recognition strap of the cable, and tearing away the left part for a first length from the encapsulation layer;
   step 2, pre-stripping a right part of the encapsulation layer: by the stripping clamp, clamping the right part and splitting the right part from the encapsulation layer at a second separating line which is corresponding to a first right side color-recognition strap of the cable, and tearing away the right part for the first length from the encapsulation layer;
   step 3, pre-stripping an upper part of the encapsulation layer: by the stripping clamp, clamping the upper part and splitting the upper part from the encapsulation layer at a central third separating line, and tearing away the upper part for the first length from the encapsulation layer to obtain a pre-stripped upper encapsulation layer;
   step 4, stripping the upper part secondarily: clamping and pulling backwards the pre-stripped upper part of the encapsulation layer in the step 3 by a clamping tool for a second length;
   step 5, stripping a lower part of the encapsulation layer, and stripping the right part and the left part secondarily: enabling a top of each of the left part and the right part to be exposed, after the upper part is secondarily stripped; and clamping and pulling backwards the lower part by the stripping clamp for the second length, wherein, the left part and the right part are separating apart by pulling backwards the lower part; and
   step 6, stripping the encapsulation layer completely and exposing a central pipe body of the cable which is inside the encapsulation layer, cutting the encapsulation layer which is stripped, and exposing the central pipe body completely;
   wherein the first length in the step 1 to the step 3 is 5 cm to 10 cm, the second length in the step 4 to the step 5 is greater than the first length in the step 1 to the step 3.

2. The method for stripping an encapsulation layer of a cable according to claim 1, wherein the clamping tool in the step 4 is a rotating stripper.

3. The method for stripping an encapsulation layer of a cable according to claim 2, wherein the stripping clamp comprises two clamp mouths and two opening and closing handles, each of the clamp mouths and a corresponding one of the opening and closing handles are integrally formed as an integral portion, the integral portion is placed across and connected with another integral portion by a hinge shaft.

4. The method for stripping an encapsulation layer of a cable according to claim 3, wherein each of the two clamp mouths is designed to be in an L-shaped beak shape, and a working end of each of the two clamp mouths is configured to be a sharp head.

5. The method for stripping an encapsulation layer of a cable according to claim 2, wherein the rotating stripper comprises a rotating head and a rotating handle, and the rotating head is perpendicularly connected to the rotating handle at a middle position of the rotating handle via a connecting member.

6. The method for stripping an encapsulation layer of a cable according to claim 5, wherein the rotating head is provided with a clamping opening, and the clamping opening matches a specification of the upper part of the encapsulation layer.

7. The method for stripping an encapsulation layer of a cable according to claim 1, wherein the clamping tool in the step 4 is the stripping clamp.

\* \* \* \* \*